(12) United States Patent
Schlerf et al.

(10) Patent No.: US 12,346,382 B2
(45) Date of Patent: *Jul. 1, 2025

(54) NAVIGATION GOAL IDENTIFICATION USING CLUSTERING

(71) Applicant: ZenPayroll, Inc., San Francisco, CA (US)

(72) Inventors: John Edward Schlerf, Oakland, CA (US); Nicholas Lee Gaylord, Alameda, CA (US); Melanie Manguin, San Francisco, CA (US)

(73) Assignee: ZenPayroll, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/581,771

(22) Filed: Feb. 20, 2024

(65) Prior Publication Data

US 2024/0248931 A1 Jul. 25, 2024

Related U.S. Application Data

(63) Continuation of application No. 17/901,789, filed on Sep. 1, 2022, now Pat. No. 11,941,066.

(51) Int. Cl.
G06F 16/30 (2019.01)
G06F 16/906 (2019.01)

(52) U.S. Cl.
CPC .................. *G06F 16/906* (2019.01)

(58) Field of Classification Search
CPC .................................................. G06F 16/906
See application file for complete search history.

(56) References Cited

U.S. PATENT DOCUMENTS

| | | | |
|---|---|---|---|
| 8,650,139 | B2 | 2/2014 | Jain et al. |
| 10,322,009 | B2 | 6/2019 | Aghayev et al. |
| 10,783,210 | B1 | 9/2020 | Dhillon et al. |
| RE49,486 | E | 4/2023 | Ben-Ami et al. |
| 2010/0005403 | A1 | 1/2010 | Rozmaryn et al. |
| 2012/0271805 | A1 | 10/2012 | Holenstein et al. |
| 2014/0236875 | A1 | 8/2014 | Phillipps et al. |
| 2015/0007065 | A1 | 1/2015 | Krishnamoorthy et al. |

(Continued)

OTHER PUBLICATIONS

PCT Invitation to Pay Additional Fees, PCT Application No. PCT/US2023/29157, Nov. 15, 2023, 2 pages.

(Continued)

*Primary Examiner* — Khanh B Pham
(74) *Attorney, Agent, or Firm* — Fenwick & West LLP

(57) ABSTRACT

A central database system provides predictive web navigation using machine learning and clustering to guide a user to a web page. After tracking a number of web pages viewed by various users on one or more web domains and the orders in which these web pages are viewed, the central database system can train a model to predict which web page a user is likely to view next. If the user is lost while navigating, the central database system may guide the user to the predicted web page. In one example of guidance, the central database system presents a web element with a hyperlink to the predicted web page. For example, the central database system can modify a web page that the lost user is presently viewing to include an iframe with a recommendation to travel to a different web page.

20 Claims, 8 Drawing Sheets

(56) References Cited

U.S. PATENT DOCUMENTS

| | | |
|---|---|---|
| 2015/0371142 A1 | 12/2015 | Jain |
| 2018/0032877 A1 | 2/2018 | Jain et al. |
| 2018/0114139 A1 | 4/2018 | Kucera |
| 2019/0007508 A1 | 1/2019 | Xu et al. |
| 2019/0034535 A1 | 1/2019 | Ezepov |
| 2020/0042567 A1 | 2/2020 | Birch et al. |
| 2020/0159550 A1* | 5/2020 | Myers ................ H04M 7/0027 |
| 2020/0219013 A1 | 7/2020 | Wellman et al. |
| 2022/0129777 A1 | 4/2022 | White et al. |
| 2022/0138101 A1 | 5/2022 | Appu et al. |
| 2022/0207093 A1 | 6/2022 | Badr |
| 2022/0357961 A1* | 11/2022 | Ragotte ................ G06Q 10/063 |
| 2023/0267475 A1* | 8/2023 | Navarro ................ G06F 16/958 |
| | | 705/304 |

OTHER PUBLICATIONS

United States Office Action, U.S. Appl. No. 17/901,789, filed Oct. 26, 2023, 14 pages.

PCT International Search Report and Written Opinion, PCT Application No. PCT/US23/29157, Jan. 31, 2024, 12 pages.

United States Office Action, U.S. Appl. No. 18/509,849, filed Jun. 26, 2024, 24 pages.

\* cited by examiner

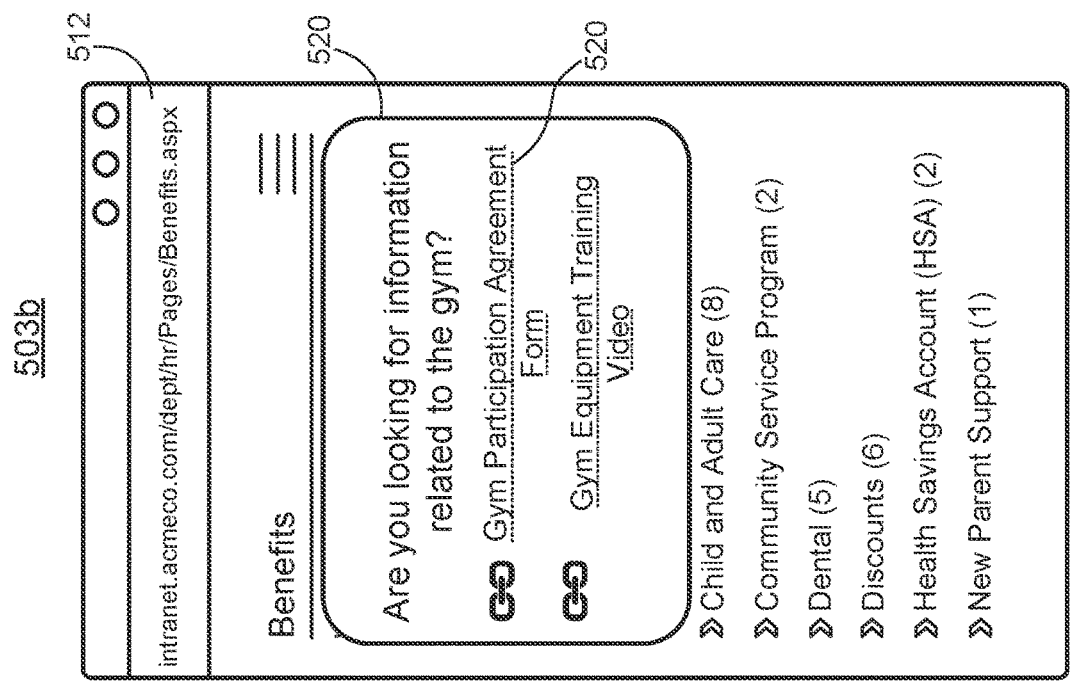
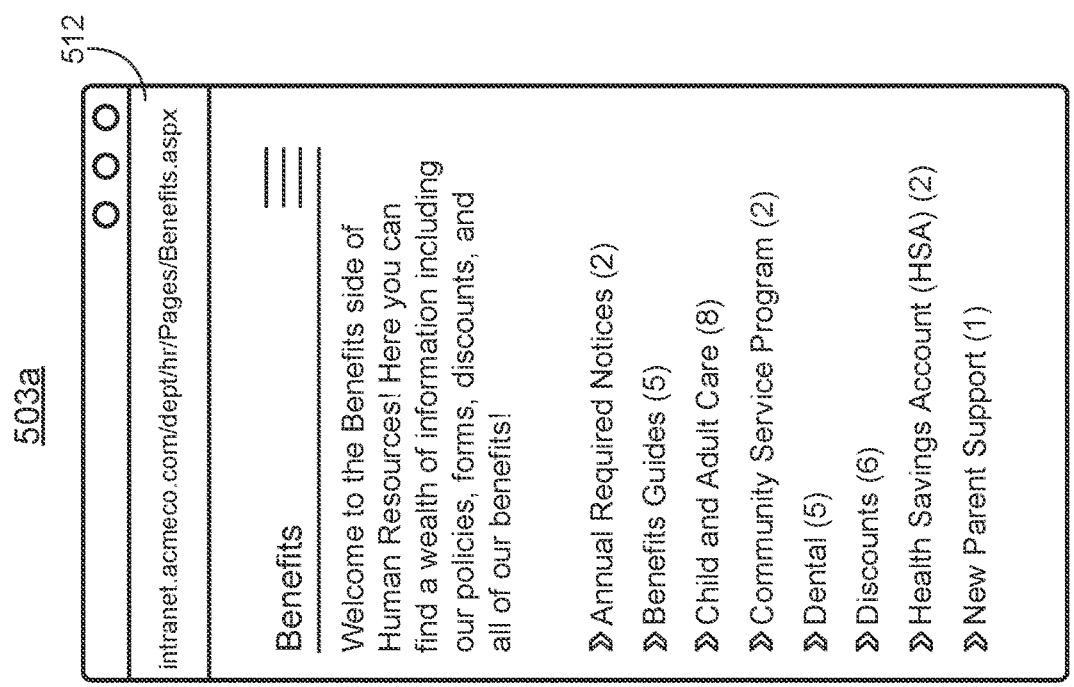
FIG. 5A
FIG. 5B

700

701 — Identify, for each of a set of historical users, an action being performed by the historical user within a domain and a set of web pages viewed by the historical user while performing the action

702 — Generate a training data set including, for each of the set of historical users, the identified action and the set of web pages viewed while the action is being performed

703 — Train a cluster model using the training data set

704 — Apply a machine-learned model to web pages viewed by a target user to predict a next web page to be viewed by the target user

705 — Apply the cluster model to the web pages viewed by the target user and the predicted next web page to identify an action being performed by the target user

706 — An observed next web page viewed by the target user is unrelated to the identified action being performed by the target user?

No → (returns to 704)
Yes ↓

707 — Modify an interface displayed to the target user to include a web element to direct the target user to the predicted next web page

FIG. 7

NAVIGATION GOAL IDENTIFICATION USING CLUSTERING

CROSS REFERENCE TO RELATED APPLICATIONS

This application is a continuation of U.S. application Ser. No. 17/901,789, filed Sep. 1, 2022, now U.S. Pat. No. 11,863,641, which is incorporated by reference in its entirety.

This disclosure relates generally to web navigation, and more specifically to machine-learned web navigation.

BACKGROUND

The organization of web pages in a website is generally non-standard. Each website looks different than the next. A website's user can take many possible paths to perform one action. No one path is necessarily the best path to take. Furthermore, users can perform hundreds or thousands of tasks on a given website. Enumerating all possible paths for each website and each task to guide a user as they navigate a given website is both processing intensive and inefficient (e.g., because each user may prefer a different path or because different websites organize their web pages differently).

SUMMARY

A central database system provides predictive web navigation using machine learning and clustering to guide a user to a web page for which they are predicted to be looking. After tracking a number of web pages viewed by various users on one or more web domains and the orders in which these web pages are viewed, the central database system can train a model to predict which web page a user is likely to view next. If the user is lost while navigating, the central database system may guide the user to the predicted web page. In one example of guidance, the central database system presents a web element with a hyperlink to the predicted web page. For example, the central database system can modify a web page that the lost user is presently viewing to include an iframe with a recommendation to travel to a web page.

Furthermore, the central database system may leverage web pages viewed and determined web page recommendations for end-users of a website to provide information to administrators of the website to guide further design of the website. For example, an administrator of a website may use a user interface to design a website. The central database system may determine which web navigation path is most commonly taken by end-users on the website to perform a particular task (e.g., access contact information for a company) and generate a prompt on the user interface for an administrator with a recommendation to modify a web page (e.g., existing or new web page) of the website to reduce the average amount of web pages viewed per user in accomplishing the particular task.

In one embodiment, the central database system tracks, for each of a set of users, a number and order of web pages within a domain viewed by the user. The central database system generates a training data set using, for each of the users, the tracked number and order of web pages within the domain viewed by the user and one or more characteristics of the user. The machine-learned model is then trained using the generated training data set to predict a next web page to be viewed by a viewing user based on web pages previously viewed by the viewing user and characteristics of the viewing user. The central database system can identify characteristics of a target user and web pages that they have viewed. After applying the trained machine-learned model to the identified characteristics and web pages associated with the target user, the central database system can predict a next web page viewed by the target user.

BRIEF DESCRIPTION OF THE DRAWINGS

FIGS. 5A-5B show an example approach for predictive web navigation using the central database system described herein, in accordance with at least one embodiment.

FIG. 7 is a flowchart illustrating a process for modifying an interface to direct a user to a predicted next web page, in accordance with at least one embodiment.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
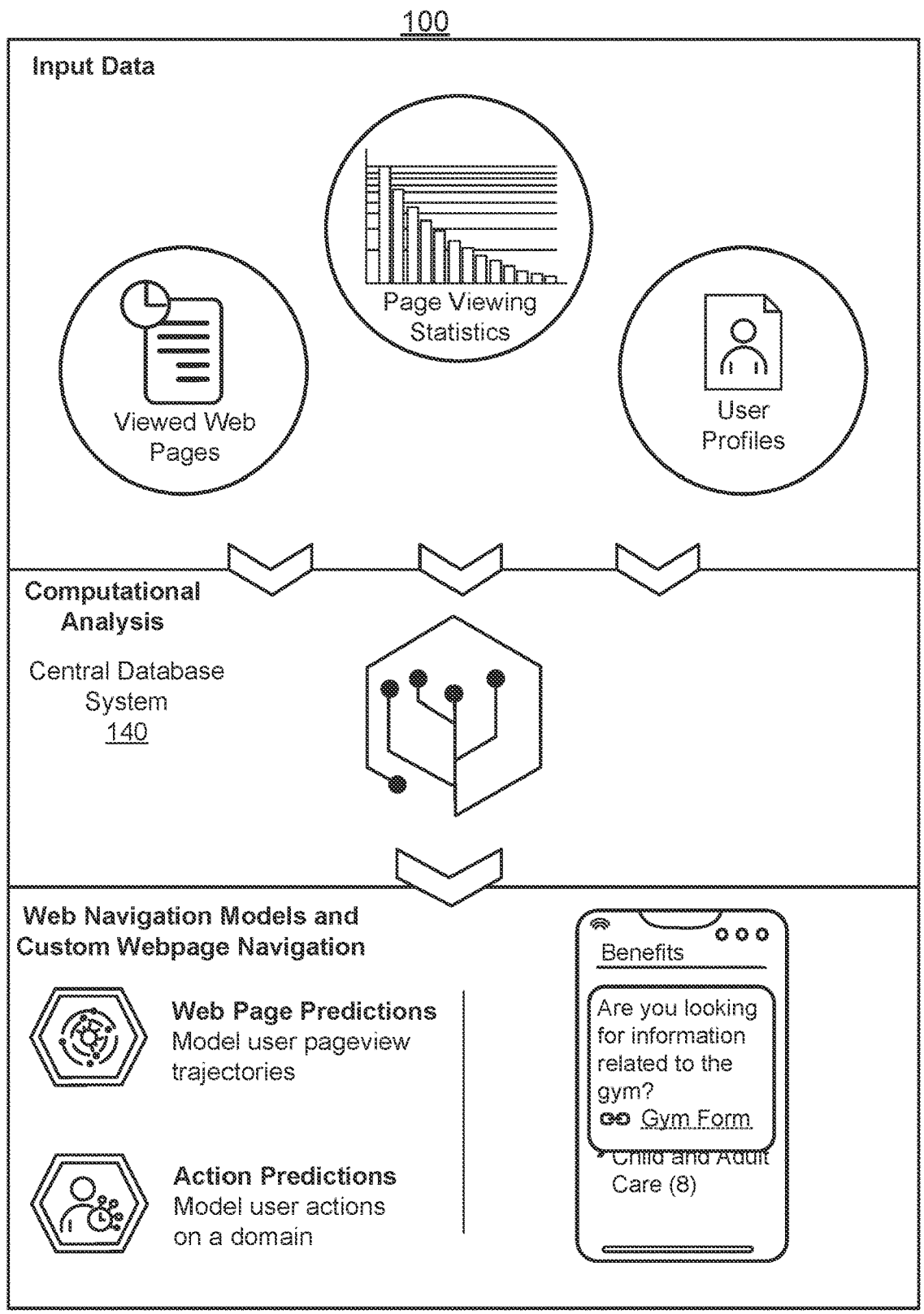
FIG. 1 depicts a process for predictive web navigation using a central database system, in accordance with at least one embodiment.

FIG. 1 depicts a process for predictive web navigation using a central database system 140, in accordance with at least one embodiment. The central database system 140 applies machine learning and clustering to guide a user to a web page for which they are likely looking. After tracking a number of web pages viewed by various users on one or more web domains and the orders in which these web pages are viewed, the central database system 140 can train a model to predict which web page a user is likely to view next. If the user is lost while navigating, the central database system 140 may guide the user to the predicted web page. A web element with a hyperlink to the predicted web page can be presented to the lost user. For example, the central database system 140 can modify a web page that the lost user is presently viewing to include an iframe with a recommendation to travel to a web page (e.g., to find a form to access a gym).

In some embodiments, the central database system 140 may analyze web page addresses to determine relationships between sequences of web page addresses viewed by a user. These relationships may show a likely progression of web pages in a user's web browsing journey. The central database system 140 can leverage these relationships, information about web navigating users (e.g., user characteristics in user profiles), and statistics about web page views (e.g., a number of visitors to a given web page) for predictive web navigation. Although not depicted in FIG. 1, the central database system 140 may use additional or alternative input data such as context information describing a user's web session (e.g., an account with which the user is logged in on a domain). The terms "web domain" and "domain" are used interchangeably herein to refer to a collection of web pages unless a different meaning is apparent from the context in which they are used. Additionally, the terms "web session" and "session" are used interchangeably herein unless a different meaning is apparent from the context in which they are used.

The central database system 140 can train and apply machine-learned models to predict a next web page that a user is likely to view. For example, a user who is trying to find their employer's policy for travel reimbursement lost amongst web pages related to human resources (HR) may be more likely to view a web page having the employer's travel reimbursement policy after being presented with the web page by the central database system 140. A machine-learned model applied by the central database system 140 may be configured to predict a next web page a user will view based on an order of web pages that the user has previously viewed and information about the user (e.g., that they recently flew across the country to visit a different office of their employer).

Additionally, the central database system 140 can perform action predictions. The central database system 140 can use clustering techniques to identify an action a user is likely performing while browsing web pages. The central database system 140 can train a cluster model to determine clusters of vectors representative of web page addresses that a user visits, where each cluster is a different action the user may be performing. By identifying an action that a user is likely trying to perform while browsing a domain and providing the user with a recommendation to view a predicted web page when they are lost, the central database system 140 can assist users in navigating complex organizations of web pages within a domain. The central database system 140 has an added benefit of preventing memory resources from being utilized without being realized. For example, an HR team stores a reimbursement policy on a web page on the employer's website but it is rarely or never accessed because users cannot find the web page. In this example, the central database system 140 can guide users to the reimbursement policy to promote the use of the memory resources that the policy and corresponding web page occupies on a server.

Figure 2:
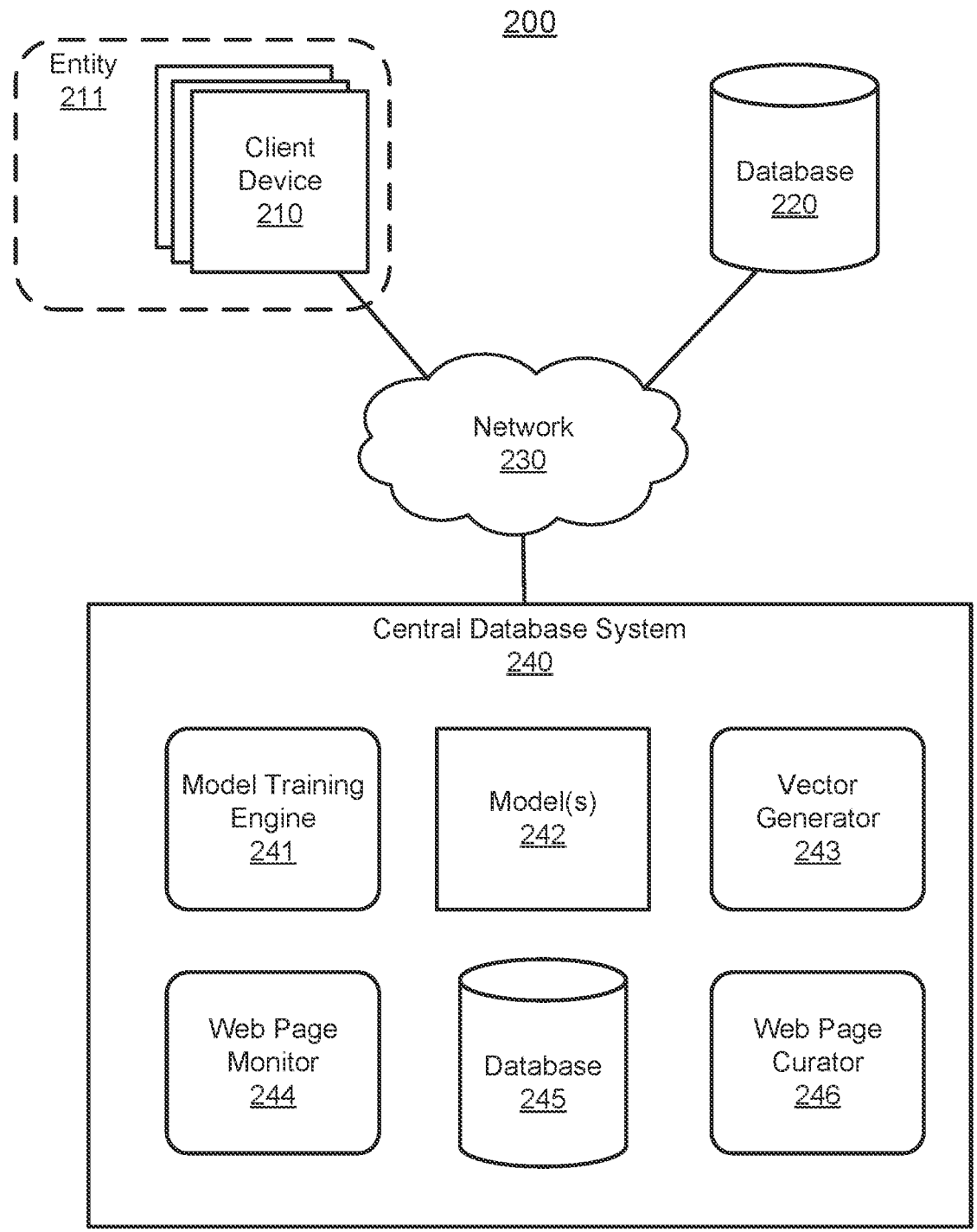
FIG. 2 is a block diagram of a system environment in which a central database system operates, in accordance with at least one embodiment.

FIG. 2 is a block diagram of a system environment 200 in which the central database system 240 operates, in accordance with at least one embodiment. The system environment 200 shown by FIG. 2 includes a client device 210, a database 220, a network 230, and a central database system 240. The central database system 240 may be an embodiment of the central database system 140 of FIG. 1. The system environment 200 may have alternative configurations than shown in FIG. 2, including for example different, fewer, or additional components. In one example, additional entities may be included within the system environment 200. In another example, additional databases at which entities may store data related to their web pages or their users may be communicatively coupled to the network 230.

The client device 210 is a computing device capable of receiving user input as well as transmitting and/or receiving data via the network 230. In some embodiments, the client device 210 is a computer system such as a desktop or a laptop computer. Alternatively, the client device 210 may be a device having computer functionality, such as a personal digital assistant (PDA), a mobile telephone, a smartphone, or another suitable device. In one example, the client device 210 can be configured to communicate with the central database system 240 via the network 240 using a native application executed by the client device 210 or through an application programming interface (API) running on a native operating system of the client device 210, such as IOS® or ANDROID™. In another example, the client device 210 may be configured to communicate with the central database system 240 via an API running on the central database system 240. The environment 200 may have one or more client devices 210. Users of the client devices 210 and by extension, the client devices 210 themselves, may be associated with an entity 211. The entity 211 may be a business, group, individual, or the like that is associated with users of the client devices 210 (e.g., the users are employees of a business or clients of a social media service).

The database 220 stores data for providing predictive web navigation. The database 220 may include data for input into a model (e.g., a machine-learned model) for recommending a next web page that a user is likely to view. The data can include web pages viewed by the user, user characteristics, web session context, any suitable data describing a user's web navigation, or a combination thereof. Data describing the web pages viewed by the user may include a number of web pages viewed, an order in which the web pages were viewed, web page addresses of the viewed web pages, web markup representing the content displayed at the web page (the web markup can have sensitive, personal data anonymized and removed before upload to the database 220 for storage), any suitable data describing a web page that a user can view, or a combination thereof.

User characteristics may be retrieved from a user profile (e.g., a profile of the user hosted by an entity's human resources department) that may also be stored at the database 220 or at a remote server that is communicatively coupled to the database 220 and/or the central database system 240 through the network 230. User characteristics may include biographic information, employment information, personal preferences of feedback of the web navigation provided by the central database 240 (e.g., a history of previously accepted or rejected web page recommendations), any suitable data describing the user that affect their web navigation, or a combination thereof.

Session context may include an account identifier associated with an authenticated session (e.g., a username for a domain the user has logged into when navigating the domain), a duration of time during which the session is active (e.g., a login duration), a type of web browser used during the session, a type of device used during the session (e.g., smartphone, laptop, etc.), a time that the session began and/or ended (e.g., a calendar date or hour), an Internet protocol address, any suitable data describing a session during which a user is browsing one or more domains, or a combination thereof.

The network 230 may serve to communicatively couple the client device 210, the database 220, and the central database system 240. The network 230 may comprise any combination of local area and/or wide area networks, using wired and/or wireless communication systems. In some embodiments, the network 230 uses standard communications technologies and/or protocols. For example, the network 230 includes communication links using technologies such as Ethernet, 802.11, worldwide interoperability for microwave access (WiMAX), 3G, 4G, 5G, code division multiple access (CDMA), digital subscriber line (DSL), etc. Examples of networking protocols used for communicating via the network 230 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 230 may be represented using any suitable format, such as hypertext markup language (HTML) or extensible markup language (XML). In some embodiments, all or some of the communication links of the network 230 may be encrypted using any suitable technique or techniques.

The central database system 240 provides predictive web navigation for a user browsing a domain. A web domain may have hundreds or potentially thousands of web pages (e.g., an Internet encyclopedia) that can be viewed by visiting users. Users can easily get lost or frustrated within one domain, and the challenge can intensify when a user is navigating multiple web domains that each may organize their web pages differently. The central database system 240 can assist users in navigating various domains or web pages by recommending a next web page the user is likely to view based on their previously viewed web pages. For example, the central database system 240 may track a user's viewed web pages as they are navigating their employer's human resources (HR) web pages to determine that they are likely trying to find a particular resource (e.g., a web page to submit time off) and modify an interface to guide the user to the particular resource (e.g., provide a hyperlink to the web page to submit time off).

To determine a web page to help a user navigate a web domain, the central database system 240 may use a machine-learned model, a cluster model, or a combination thereof. In some embodiments, the central database system 240 may apply a machine-learned model to web pages previously viewed by a user and the user's characteristics. For example, a user, an employee who has moved to a different state, reports their change of state to their employer's HR department. The HR department updates the employee's profile to reflect this updated user characteristic. Subsequently, when the employee is on their employer's intranet looking state withholding amounts, the central database system 240 may recommend that the user look at a web page for state withholding amounts for their new state using a machine-learned model that has been trained on historical users' navigation paths taken when seeking information about tax returns. Furthermore, the central database system 240 may use a machine-learned model to determine follow-up actions related to a determined action. The term "follow-up actions" may refer to an action that follows another action (e.g., in a sequence of interrelated tasks performed by a user). The central database system 240 may train a machine-learned model based on a sequence of actions performed by a historical user to determine a subsequent action that is likely to be performed. For example, the central database system 240 may determine that a user is likely to query a web page for remedying a deficiency between the income tax withheld and a state's withholding amount. Thus, the central database system 240 can identify actions and optionally, follow-up actions, based on patterns of web pages viewed, actions that have been previously performed, or a combination thereof.

The central database system 240 includes a model training engine 241, one or more models 242, a vector generator 243, a web page monitor 244, a database 245, and a web page curator 246. The model training engine 241, model(s) 242, vector generator 243, web page monitor 244, and web page curator 246 may be software modules (e.g., code embedded on a machine-readable medium). The central database system 240 may have alternative configurations than shown in FIG. 2, including different, fewer, or additional components. For example, the functions of the model training engine 241 may be performed by a third party that provides trained models to the central database system 240 via the network 230. Accordingly, there may be embodiments in which the central database system 240 operates without the model training engine 241.

The model training engine 241 trains the one or more models 242. The model training engine 241 may generate training data sets for training the one or more models 242. In some embodiments, the model training engine 241 may generate feature vectors and corresponding labels for inclusion within a training data set. The training engine 241 may retrain the one or more models 242. The model training engine 241 may filter which data is used for training or retraining the one or more models 242. In some embodiments, the model training engine 241 may be absent from the central database system 240; rather, the central database system 240 may receive a model that has been trained remote from the system 240 (e.g., by a third party server).

The model training engine 241 may train a machine-learned model of the one or more models 242. In some embodiments, the model training engine 241 generates a training data set using at least one of web pages viewed by users and corresponding user characteristics. The model training engine 241 may use feature vectors (e.g., generated by the vector generator 243) that are quantitative representations of one or more of users' previously viewed web pages (e.g., pageview histories), characteristics, or session contexts. Additionally, the model training engine 241 may train a machine-learned model using web markup (e.g., HTML) used to render the web pages, where the web markup can indicate a type of content presented for display to a user (e.g., a multimedia content item such as a movie or an image). The model training engine 241 may label the feature vectors to represent a web page viewed by the users. In particular, the model training engine 241 can use a label indicative of a next web page viewed by a user, where the next web page follows an order of web pages represented in the feature vector being labeled. The model training engine 241 may generate a label manually (e.g., using a user-provided label) or automatically (e.g., using computer vision). For example, the model training engine 241 may automatically label a feature vector based on a similarity (e.g., cosine similarity) with a previously labeled feature vector. The model training engine 241 may retrieve labels from pageview histories stored in the database 220 or 245.

The model training engine 241 may train a machine-learned model of the one or more models 242 in multiple stages. In a first stage, the model training engine 241 may use generalized data collected across various domains or websites, web sessions, users, entities, any suitable characteristic for web navigation, or a combination thereof. For example, the model training engine 241 may use page view histories across various domains and user characteristics of various users to create generalized data for a first stage of training a machine-learned model. The training data set of the first stage's training may be labeled to indicate a next web page that a given user navigates to in a sequence of web pages in the pageview history for the given user. The model training engine 241 may create a first training data set based on the labeled generalized data. The model training engine 241 can train a model of the one or more models 242 using the first training data set to determine a web page to which a user is likely to navigate based on previous web pages viewed by the user (e.g. during a web session). In some embodiments, the central database 240 may outsource the collection of data for training machine-learned models, the training of the machine-learned models, or a combination thereof to a third party. The central database 240 may maintain user privacy by encrypting user data or any suitable mechanism for anonymizing user data (e.g., a history of a user's actions).

In a second stage of training, the model training engine 241 may tailor the web page determination by a machine-learned model to a particular characteristic of web navigation such as a specific user, user characteristic, entity, or web domain. For example, during the second stage of training, the model training engine 241 retrains the machine-learned model, which was trained in the first stage, using pageview history within a single web domain rather than various domains. That is, the model training engine 241 may create a second training data set of the pageview history within the single web domain.

The model training engine 241 may train two or more machine-learned models based on different characteristics of web navigation to predict a next web page to be viewed by a user. For example, a first machine-learned model of the models 242 may be used to predict a next web page based on web pages viewed by a user and user characteristics (e.g., from a user profile hosted by an entity's human resources department) and a second machine-learned model of the models 242 may be used to predict a next web page based on web pages viewed by a user and session context data (e.g., obtained from tracking pixels). The various machine-learned models may be stored in the database 220 or 245 for selection by the web page curator 246 based on the data tracked for web navigation predictions. The selection of machine-learned models is further described with respect to the web page curator 246.

Additionally or alternatively, a second training data set used in the second stage of training may be created by the model training engine 241 based on user feedback associated with successful or failed web page predictions. For example, a user provides feedback that a machine-learned model correctly identified a next web page to which the user was intending to navigate. In response, the model training engine 241 may strengthen a relationship or an association between the predicted web page output and the web pages, user characteristic, session context, or other input data to which the machine-learned model was applied. Similarly, in response to a user providing feedback that a machine-learned model incorrectly identified a next web page, the model training engine 241 may weaken a relationship or an association between the predicted web page and the input data to which the machine-learned model was applied.

The model training engine 241 can generate a training data set representative of a state of the user during web navigation. Examples of user states include being lost while navigating or assured in their navigation. An order of web pages that a user viewed may correspond to a particular user state. For example, an order of web pages having web addresses that do not meet a threshold similarity between consecutive pairs of web pages in the order may reflect a user state of being lost while navigating. In contrast, an order of web pages having at least the threshold similarity between consecutive pairs of web pages in the order may reflect a user state of not being lost or being assured in their navigation. To determine feature vectors corresponding to a particular user state, the model training engine 241 may determine similarity metrics (e.g., cosine similarity) of pairs of feature vectors representing consecutively viewed web pages. The model training engine 241 may then determine feature vectors having similarity scores that meet or exceed a threshold similarity metric as corresponding to an order of web pages viewed when the user was assured in their navigation. The model training engine 241 may additionally or alternatively determine feature vectors having similarity scores that do not meet the threshold similarity metric as corresponding to an order of web pages viewed when a user was lost.

The model training engine 241 may use the determined feature vectors to train one or more machine-learned models to identify that a user is likely is or is not lost during web navigation. In some embodiments, the model training engine 241 may omit the feature vectors determined to correspond to a user lost during web navigation from training a machine-learned model to predict a next web page that a user intended to view. For example, using a set of feature vectors corresponding to a user's pageview history, the model training engine 241 may identify a first subset of the feature vectors corresponding to web pages viewed by a user when they were lost. The model training engine 241 may then identify a second subset of feature vectors corresponding to web pages viewed by the user before and/or after viewing the web pages associated with the first subset. The model training engine 241 may use the second subset of feature vectors to train a machine-learned model to determine a likely next web page a user will visit based on at least the user's pageview history. In some embodiments, the model training engine 241 may apply a first set of weights to feature vectors associated with the user being lost and a second set of weights to feature vectors associated with the user being assured in their navigation, where the first set of weights are greater than the second set of weights.

The model training engine 241 can retrain a machine-learned model of the one or more models 242 using an observed next web page that a user visits. The web page monitor 244 may monitor the web pages that the user views, which can include the observed next web page following an order of web pages used to determine a predicted next web page. The model training engine 241 may receive the observed next web page from the web page monitor 244 and compare the observed next web page with the predicted next web page output by one of the models 242. In one example, the model training engine 241 can compare web page addresses to determine whether the observed and predicted web pages match. In response to determining that the observed and predicted web pages match, the model training engine 241 may generate or update a training data set to include feature vectors representing the web pages viewed for which a prediction of the next web page was made, where the feature vectors are labeled with the predicted web page. The updated training data set may be used to retrain a machine-learned model to strengthen an association between the web pages viewed and the predicted next web page. In response to determining that the observed and predicted web pages do not match, the model training engine 241 may similarly generate or update a training data set; however, the machine-learned model may be retrained using this updated training data set to weaken the association between the web pages viewed and the predicted next web page.

The model training engine 241 can filter which feature vectors are used to train or retrain a machine-learned model based on characteristics of web pages, pageview history, sessions, the users viewing the web pages, any suitable characteristic of a user's web navigation, or a combination thereof. In one example, the model training engine 241 can filter feature vectors for inclusion in training a machine-learned model using keywords in web page addresses. The model training engine 241 can determine keywords that appear in web page addresses within the same domain or across multiple domains. These keywords may be descriptive of the web page's content (e.g., "profile" or "account" for a user's account information or "department" for an entity's human resource, finance, facilities, or other departments). The keywords may exist in contrast to a sequence of letters and numbers that are relatively nondescript (e.g., an anchor tag for a web page) compared to keywords designed to organize the structure of web pages on a domain.

The model training engine 241 can access web page addresses stored in the database 220 or 245 and determine a number of frequently appearing keywords (e.g., generating a histogram of text strings found in web page addresses). The model training engine 241 may determine abbreviations or spelling variations for keywords (e.g., using a word embedding or any suitable natural language processing technique) to count web page addresses having a particular keyword and corresponding abbreviations or spelling variations. The model training engine 241 may train a machine-learned model using web page addresses having descriptive keywords and exclude web page addresses having nondescript text strings or exclusively nondescript text strings. In some embodiments, the model training engine 241 may weigh web page address having descriptive keywords with weights having greater values than weights used to weigh web page addresses having nondescript keywords.

The model training engine 241 may train a cluster model of the one or more models 242. The cluster model can be trained to identify an action being performed by a user based on the web pages viewed by the user. The model training engine 241 may apply a cluster model to web pages viewed by users and optionally, specify a number of clusters for the cluster model to output (e.g., using k-means clustering). In one example, the number of clusters to output may be equivalent to the number of actions being performed by the users when viewing the web pages being clustered. In this example, a training data set for training a cluster model may include web pages viewed and a number of actions being performed through the viewing history. A training data set may include feature vectors representing the web pages viewed by users. The model training engine 241 may input feature vectors of the web pages viewed by users into the cluster model and receive as output two or more clusters corresponding to actions that the users were performing based on the web pages viewed.

The model training engine 241 may determine a number of actions being performed by users through the viewed web pages used for training data sets. The number of actions may be provided manually. For example, the model training engine 241 may receive a number of actions from a human operator of the system 240 who has labeled an order of web pages tracked by the web page monitor 244. The number of actions may be determined automatically (e.g., simultaneously during the clustering process through mechanisms such as hierarchical clustering that do not require a specified number of clusters to fit data in advance of the clustering).

The model training engine 241 may filter feature vectors to determine a particular subset of feature vectors to include in a training data set for a cluster model. As described with respect to filtering feature vectors for training a machine-learned model to predict a next web page to be viewed by a user, the model training engine 241 can similarly filter out feature vectors representative of web pages the user visited when the user was likely lost, and train a cluster model using exclusively feature vectors representative of web pages the user visited when the user was not lost. In another example, the model training engine 241 may filter feature vectors based on a shared characteristic of web navigation such as a shared domain, user characteristic (e.g., users who recently changed their address in their employer's human resources database), session context (e.g., web pages viewed on U.S. Tax Day, April 15).

The model training engine 241 may train various cluster models to identify different actions based on different characteristics of web navigation (e.g., session context, user characteristics, web pages viewed, etc.). In one example, a first cluster model can be trained to identify tax document retrieval based on session context and web pages viewed and a second cluster model can be trained to identify beneficiary change based on user characteristics and web pages viewed. The various cluster models may be stored in the database 220 or 245 for selection by the web page curator 246 based on the data tracked for web navigation predictions. The selection of cluster models is further described with respect to the web page curator 246.

The model training engine 241 may retrain a cluster model of the one or more models 242. The model training engine 241 may receive user feedback indicating that an action identified by the cluster model was correct or incorrect. In one example of determining that the user feedback indicates that the action is correct, a user provides feedback that a web page address recommended by the system 240 to the user was helpful. In this example, the recommended web page address was determined using the identified action, and thus, the feedback may indicate that the identified action was correct. In one example of determining that the user feedback indicates that the action is incorrect, a user provides feedback that a recommended web page was unhelpful. Similar to the previous example, the feedback of the recommended web page being unhelpful is correlated with feedback of the identified action being inaccurate.

The model training engine 241 may retrain the cluster model by adjusting a number of output clusters to fit the input data. For example, the model training engine 241 may increase a number of identified actions to fit feature vectors representing web navigation occurring during identified actions. In this example, the model training engine 241 may generate a user interface for display at a client device of a human operator of the system 240 to identify what action was being performed through the pageview history of the user who indicated the recommended next web page was helpful. The model training engine 241 may reapply the input data to the updated (e.g., incremented) number of clusters and provide the result to the operator for accuracy verification. In another example, the model training engine 241 may decrease a number of identified actions to fit feature vectors representing web navigation occurring during identified actions. The model training engine 241 may reapply the input data to the updated (e.g., decremented) number of clusters and provide the results to a human operator for accuracy verification.

The one or more models 242 determine predictions for the predictive web navigation of the central database system 240. The one or more models 242 can include machine-learned models or cluster models. The model training engine 241 may train or retrain the one or more models 242. The one or more models 242 may use various machine learning techniques such as linear support vector machine (linear SVM), boosting for other algorithms (e.g., AdaBoost), neural networks, logistic regression, naïve Bayes, memory-based learning, random forests, bagged trees, decision trees, boosted trees, boosted stumps, a supervised or unsupervised learning algorithm, or any suitable combination thereof.

Additionally, the one or more models 242 may use various clustering techniques such as centroid-based clustering (e.g,. k-means clustering), density-based clustering, distribution-based clustering, hierarchical clustering, any suitable grouping technique, or a combination thereof.

A machine-learned model of the models 242 may predict or determine a likely next web page to be viewed by a user based at least on previous web pages viewed by the user. The machine-learned model may receive, as input, feature vectors representing web pages viewed by a user and characteristics of the user and output a next web page the user will likely view. The one or more models 242 may include multiple machine-learned models configured to predict a next web page based on different criteria (e.g., entity preferences, input types, etc.). For example, a first machine-learned model may be configured to predict a next web page based on previously viewed web pages of users from a particular entity and a second machine-learned model may be configured to predict a next web page based on a combination of web markup of previously viewed web pages and user characteristics.

A cluster model of the models 242 may identify an action being performed by a user based at least on their web page viewing history. The cluster model may receive, as input, feature vectors representing web pages viewed by a user and a predicted next web page to be viewed by the user, and output a cluster to which the feature vectors fit, where the cluster is associated with an action that the user is likely performing during web navigation. The one or more models 242 may include multiple cluster models configured to cluster feature vectors into clusters corresponding to identified actions based on different criteria (e.g., entity preferences, input types, etc.) and/or include multiple cluster models configured to output clusters corresponding to different actions. For example, a first cluster model may cluster feature vectors into a number of payroll related clusters (e.g., updating tax withholdings, retrieving a copy of a pay stub, setting up a direct deposit, submitting a request for time off, etc.) while a second cluster model may cluster feature vectors into a number of human resources related clusters (e.g., changing contact information, requesting discussion of a confidential matter, retrieving a organizational chart, etc.). In another example, one cluster model may cluster feature vectors representing viewed web pages and user characteristics into a number of payroll related clusters and another cluster model may cluster feature vectors representing viewed web pages and session context into the same payroll related clusters.

The vector generator 243 creates quantitative representations of orders of web pages (e.g., pageview history). In some embodiments, the quantitative representations are feature vectors. The vector generator 243 may generate feature vectors representing one or more of an order of web pages viewed by a user, the web pages, characteristics of the user, characteristics of an entity associated with the user, or the user's web session context.

The vector generator 243 may generate a vector representative of a user's navigation across two or more web pages, which may be referred to as a "combined vector." The vector generator 243 may determine a combined vector based on two or more feature vectors generated from at least an order of web pages viewed by a user. The combined vector may be a concatenation, addition, projection, product, or any suitable vector operation using the two or more feature vectors. In some embodiments, one of the models 242 may be applied to the combined vector. The vector generator 243 may generate a feature vector based on a web page's address (e.g., creating a vector space of text strings found in web page addresses to model an association between text strings present in web page addresses).

The combined vector may represent transitions between web pages. By generating a vector representative of transitions between web pages, the vector generator 243 may enable the central database system 240 to determine predictions of next web pages based on information agnostic of a particular domain, and rather an underlying organizational logic for web page structures that may be utilized by various domains. For example, the combined vector may represent a navigational flow from a domain's homepage towards a form for requesting a change in beneficiary (e.g., navigating to the human resources portal, followed by a benefits web page, and finally to a web page to change a beneficiary) more than the combined vector represents an order of web page addresses that may be unique to the domain (e.g., using nonstandard shorthand specified by the domain's web designers or alphanumeric code that's specific to the domain). In some embodiments, the feature vectors may represent web markup, which can include text (e.g., page headings) displayed at the web pages viewed by a user, and the combined vector may represent a transition between text on consecutive web pages (e.g., headings such as "Human Resources" followed by "Benefits").

The vector generator 243 may select or filter a subset of feature vectors for use in generating the combined vector by using vector characteristics (e.g., similarity between vectors). In one example, the vector generator 243 may select the subset of feature vectors having at least a threshold similarity metric with one another. The vector generator 243 can calculate similarity metrics between a web page address of the latest viewed web page of an order of web pages viewed and web page addresses of pages viewed before the latest viewed web page. The vector generator 243 can then identify a subset of the feature vectors generated using the viewed web pages, where the subset represents web page addresses having at least a threshold similarity metric with the web page address of the latest viewed web page. The vector generator 243 can then use this subset of feature vectors to generate the combined vector. That is, the vector generator 243 can generate the combined vector using the subset and without using the remaining generated vectors that do not have at least the threshold similarity metric.

The web page monitor 244 tracks web pages viewed at client devices (e.g., by users of the central database system 240). The web page monitor 244 may use tracking pixels, cookies, or any other suitable mechanism for monitoring user behavior at one or more web pages. The web page monitor 244 may track information about a user's web navigation such as web page addresses visited (web pages viewed), an order in which the addresses were visited, a duration for which a user visited each web page address, how many users visited a particular web page, types of hardware devices used to visit web pages, internet browsers used to visit web pages, any suitable characteristic of a user's visit to a web page, or a combination thereof. Such tracked information may be included within a session context information that the central database system 240 may use to predict a next web page viewed or identify an action being performed by a user. In some embodiments, the web page monitor 244 may be absent from the central database system 240. In these embodiments, the central database system 240 may receive information regarding web pages viewed by users from a third-party source (e.g., a web traffic analytics tool or software suite).

The web page monitor 244 may have access to web markup used to generate the web pages viewed by the users. In some embodiments, the web page monitor 244 may request non-sensitive content of an entity's web pages, where the entity is associated with the user using the web pages. For example, the web page monitor 244 may have access to web page markup (e.g., stored in a remote database managed by the entity) used to generate an employer's website (i.e., web pages that do not contain sensitive information about employees), where the employer uses the central database system 240 to help their employees navigate payroll web pages. The accessed web markup may indicate that a multimedia content item (e.g., an image, video, or audio) is generated at a web page. The markup may be used by the central database system 240 to generate a feature vector for input into a model to predict a next web page or identify an action. Additionally or alternatively, the markup may be used to train a model to predict a next web page. For example, the web page monitor 244 may receive a web page's markup indicating the presence of employee images and text including "Human Resources Team," and the vector generator 243 may generate a feature vector representing a user's visit to this web page (e.g., during an action of searching for a human resources manager to contact, which the central database system 240 may identify using a cluster model applied to the generated feature vector).

The database 245 stores data for the central database system 240 to perform predictive web page navigation. Examples of data stored in the database 245 may include training data sets used by the model training engine 241, web pages viewed by the user (e.g., pageview history), user characteristics (e.g., user profiles), session context data, outputs of the one or more models 242 (e.g., predicted next web pages), identified actions performed by the users, any suitable information for determining a web page to which a user should navigate, or any suitable combination thereof. In some embodiments, the database 245 may store all or some of what is stored in the database 220. Similarly, database 220 may store all or some of what is stored in the database 245. In some embodiments, only one of the databases 245 and 220 may be present.

The web page curator 246 provides recommendations for a web page to which a user can navigate. The web page curator 246 may identify data for recommending a next web page (e.g., previous web pages visited by a user, user characteristics, session context, etc.) and provide the data for input into the vector generator 243. The web page curator 246 may receive feature vectors generated by the vector generator 243 and apply at least one of the one or more models 242 to the feature vectors to determine one or more of a predicted next web page the user intends to view or an action that the user is intending to take. In some embodiments, similar to the selection performed by the model training engine 241, the web page curator 246 may select a subset of feature vectors for input into a model (e.g., based on feature vector similarity).

The web page curator 246 may instruct the model training engine 241 to retrain a cluster model of the models 242 in response to identifying that the user is performing a new action. The web page curator 246 may identify that a user is performing a new action that is different from actions that have been identified by one or more cluster models of the central database system 240. In some embodiments, the web page curator 246 may identify that a user is performing a new action by identifying a new cluster output by a cluster model in response to applying the cluster model to at least web pages viewed by the user and a predicted next web page (e.g., output by a machine-learned model of the models 242). To identify the new cluster, the web page curator 246 may analyze the clusters output by the cluster model. In particular, the web page curator 246 may determine that a center of the new cluster is at least a threshold distance from each center of clusters output by the cluster model, where the clusters correspond to identified actions. The web page curator 246 may instruct the model training engine 241 to retrain the cluster model by fitting feature vectors representing viewed web pages into an incremented number of clusters corresponding to the incremented number of actions identified due to the new action.

The web page curator 246 may determine whether a web page that a user travels to is unrelated to an action identified by a cluster model of the models 242 as what is likely being performed by the user. In response, the web page curator 246 may modify a web page or an interface being viewed by the user to direct the user to a predicted next web page as determined by a machine-learned model of the models 242. In some embodiments, the web page curator 246 may determine whether the web page that a user travels to is unrelated to an identified action by comparing identified actions and associated web pages visited when performing the identified actions. The web page curator 246 may generate a data structure mapping viewed web pages (e.g., as tracked by the web page monitor 244) to actions identified by one or more cluster models of the models 242 and store the data structure in the database 245. The web page curator 246 may query the data structure using a given web page to determine one or more actions that the user may be intending to perform by viewing the given web page. The web page curator 246 may use multiple web pages in an order of web pages viewed by a user to query the data structure and determine related actions to each of the web pages. In response to determining that a web page that a user is viewing or has viewed has not been previously associated in the data structure with an action identified as being performed by the user, the web page curator 246 may determine that the web page is unrelated to the identified action.

The web page curator 246 can modify an interface to display a web element to direct a user to the predicted next web page. The web element may be any suitable element for displaying the recommendation to direct the user to the predicted next web page. One example of the web element is an iframe element. The iframe element may include a hyperlink directing the user to the predicted next web page. Optionally, the iframe element may include text providing the user context for the recommendation. For example, the text states the action that the central database system 240 has identified the user as likely performing: "Are you trying to find your tax documents? A copy of your W-2 can be found at the following page." In another example, the web page curator 246 can display usage statistics of the central database system 240 used to determine the recommendation: "Four other users within the past week were also looking at similar web pages. Are you trying to find a copy of your pay stub? Pay stubs can be found at the following page."

The web page curator 246 can determine when to apply one of the one or more models 242 to assist a user with navigating a website or domain. In some embodiments, the web page curator 246 may determine when to apply one of the models 242 in response to receiving a user request to provide web navigation assistance. The web page curator 246 may generate a user input element (e.g., a button to request help) for display at one or more web pages of a domain. In response to receiving an indication that the user has selected the user input element, the web page curator 246 may receive data from the web page monitor 244 (e.g., web pages viewed by the user during a session) and/or the database 245 (e.g., user characteristics from a user profile or session context), provide the received data to the vector generator 243 to generate feature vectors, and provide a subset or all of the generated vectors to a machine-learned model of the models 242 to determine a predicted next web page to which the user intends to navigate.

The web page curator 246 may automatically determine when to apply one of the models 242 for predicting a next web page. The web page curator 246 may use one or more of web pages viewed, user characteristics, or session context to determine that the user is likely to accept a recommendation by the central database system 240 to navigate to a predicted next web page. The web page curator 246 may apply one or more conditions to determine when to automatically apply one of the models 242 for predicting a next web page. In a first example, the web page curator 246 may determine whether a user is lost using a machine-learned model of the models 242 configured to determine that the user's pageview history demonstrates a level of dissimilarity to reflect a user who is lost on a website. In response to determining that the user is lost, the web page curator 246 may apply another machine-learned model of the models 242 for determining a next web page to which the lost user is recommended to navigate. In a second example, the web page curator 246 may determine whether the present time is correlated to an increased visit of certain webpages (e.g., viewing web pages with tax resources around the months of March and April) and in response to determining that the present time is correlated, the web page curator 246 may apply a machine-learned model of the models 242 to determine a recommended next web page for display in an iframe on a web page that the user is viewing.

The web page curator 246 may select a machine-learned model of various machine-learned models of the models 242. Similarly, the web page curator 246 may determine which cluster model of various cluster models of the models 242 to select. The web page curator 246 may use one or more types of data available for input to the machine-learned models (e.g., session context, user characteristics, web pages) to determine which model to use. The web page curator 246 may select the model trained with inputs having the same types as the available data. For example, in response to determining user characteristics and an order of web pages viewed, the web page curator 246 may select a machine-learned model configured to predict a next web page using user characteristics and an order of web pages viewed.

Figure 3:
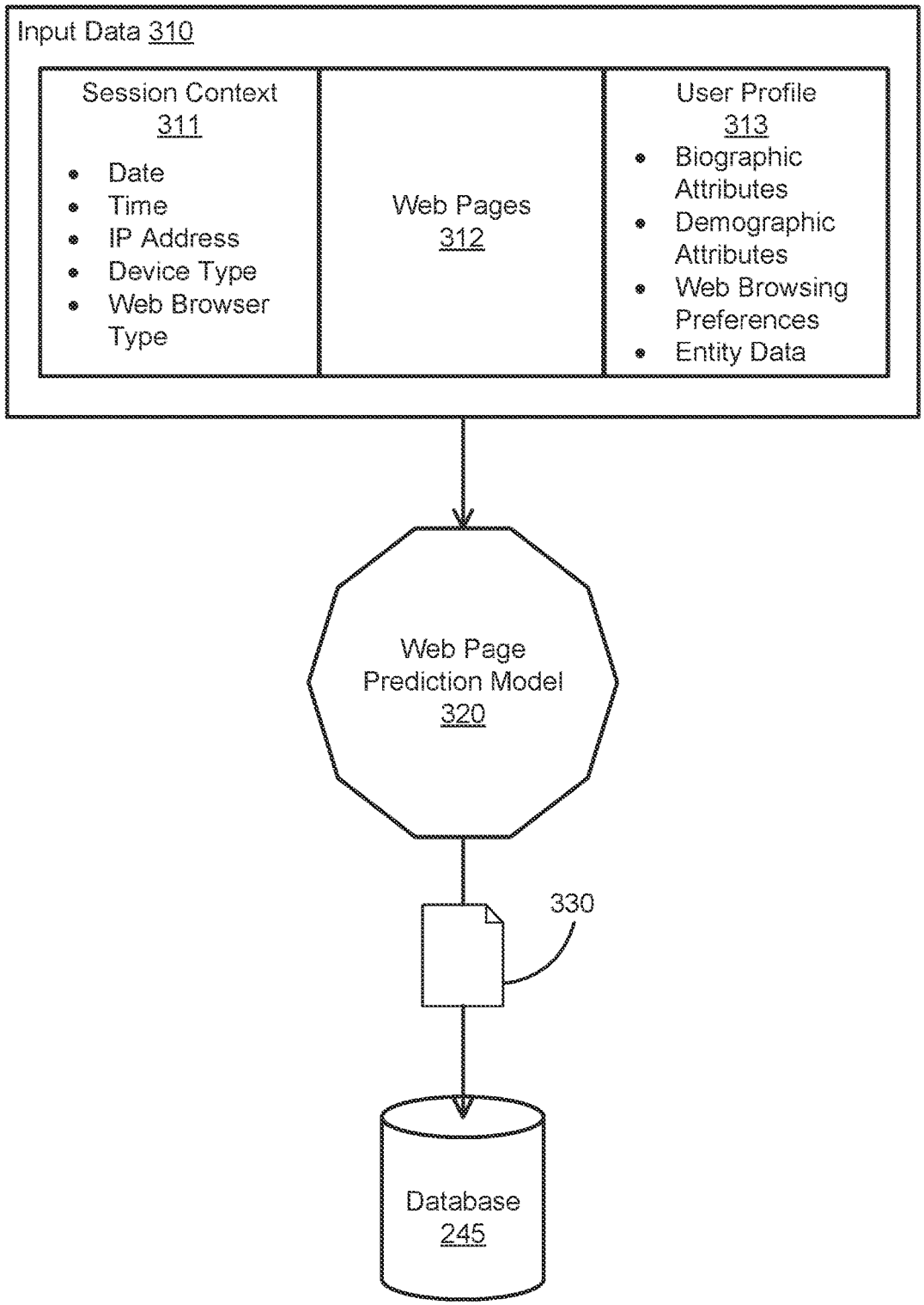
FIG. 3 is a block diagram of a process using a web page prediction model, in accordance with at least one embodiment.

FIG. 3 is a block diagram of a process 300 using a web page prediction model 320, in accordance with at least one embodiment. Components of the central database system 240 can perform the process 300. The web page prediction model 320 may be a machine-learned model of the models 242. In some embodiments, additional or fewer operations may be performed than shown in the process 300. For example, the output of the web page prediction model 320, a predicted next web page 330, may additionally or alternatively be provided to a client device (e.g., the client device 210) via a hyperlink for selection by a user who has lost their navigation on a website.

In the process 300, the web page prediction model 320 receives input data 310, which includes session context 311, web page vectors 312, and a user profile 313. Although not depicted, some or all of the input data 310 may be input to the vector generator 243, which may then output a feature vector that is input to the web page prediction model 320. Session context 311 includes, and is not limited to, a date and time that a user begins a session, and an IP address, device type, and web browser (Internet browser) type with which a user accesses the session. The web pages 312 may include a number of web pages viewed during the session, an order of the web pages viewed, web page addresses of the web pages viewed, or data representing the content of the web pages viewed (e.g., through web markup language). The user profile 313 can include biographic attributes (e.g., gender pronouns), demographic attributes (e.g., an age group or family size within which they fall), web browsing preferences (e.g., preference to block advertisements when browsing web pages), or entity data. Entity data may describe an entity with which the user is associated, such as an employer. Examples of entity data may include the type of industry the entity operates (e.g., medical, academic, government, etc.), a size of the entity (e.g., one hundred employees), a location of the entity (e.g., Europe), any suitable information describing an entity, or a combination thereof.

Using the input data 310, the vector generator 243 may generate a feature vector representing a web page of the web pages 312 and optionally, data from the session context 311 and the user profile 313. The vector generator 243 may generate multiple feature vectors corresponding to the multiple web pages that a user views during a web session. The generated feature vectors may be input into the web page prediction model 320, which may be a machine-learned model trained to determine a next web page 330 that the user is likely to view (e.g., likely to click a hyperlink to be redirected to the determined next web page). The training of machine-learned models, which can include the web page prediction model 320, is described with reference to the model training engine 241. The output of the web page prediction model 320, the predicted next web page 330, may be in the form of a web page address or a portion of a web page address. The predicted next web page 330 may be stored in the database 245. Other components of the central database system 240, such as the web page curator 246, may access the stored web page 330 for presentation on a client device or for input to a cluster model to identify an action that a user is likely performing. An example process involving a cluster model is described in the description of FIG. 4.

In one example of the process 300, the central database system 240 tracks web page addresses viewed by the user, included within the web pages 312. The web page addresses include keywords indicating that the user is browsing their employer's finance department's web pages. The central database system 240 also accesses session context 311 (e.g., as monitored through tracking pixels or cookies). The session context 311 includes April dates and personal computer device type. The central database system 240 generates a combined feature vector that represents the web page addresses of the finance department, the April web page viewing dates, and the personal computer device type. The central database system 240 applies the web page prediction model 320 to the combined feature vector to determine that the predicted next web page 330 is a web page including hyperlinks to where the user can find their tax documents. The central database system 240 stores the predicted next web page 330 into the database 245.

Figure 4:
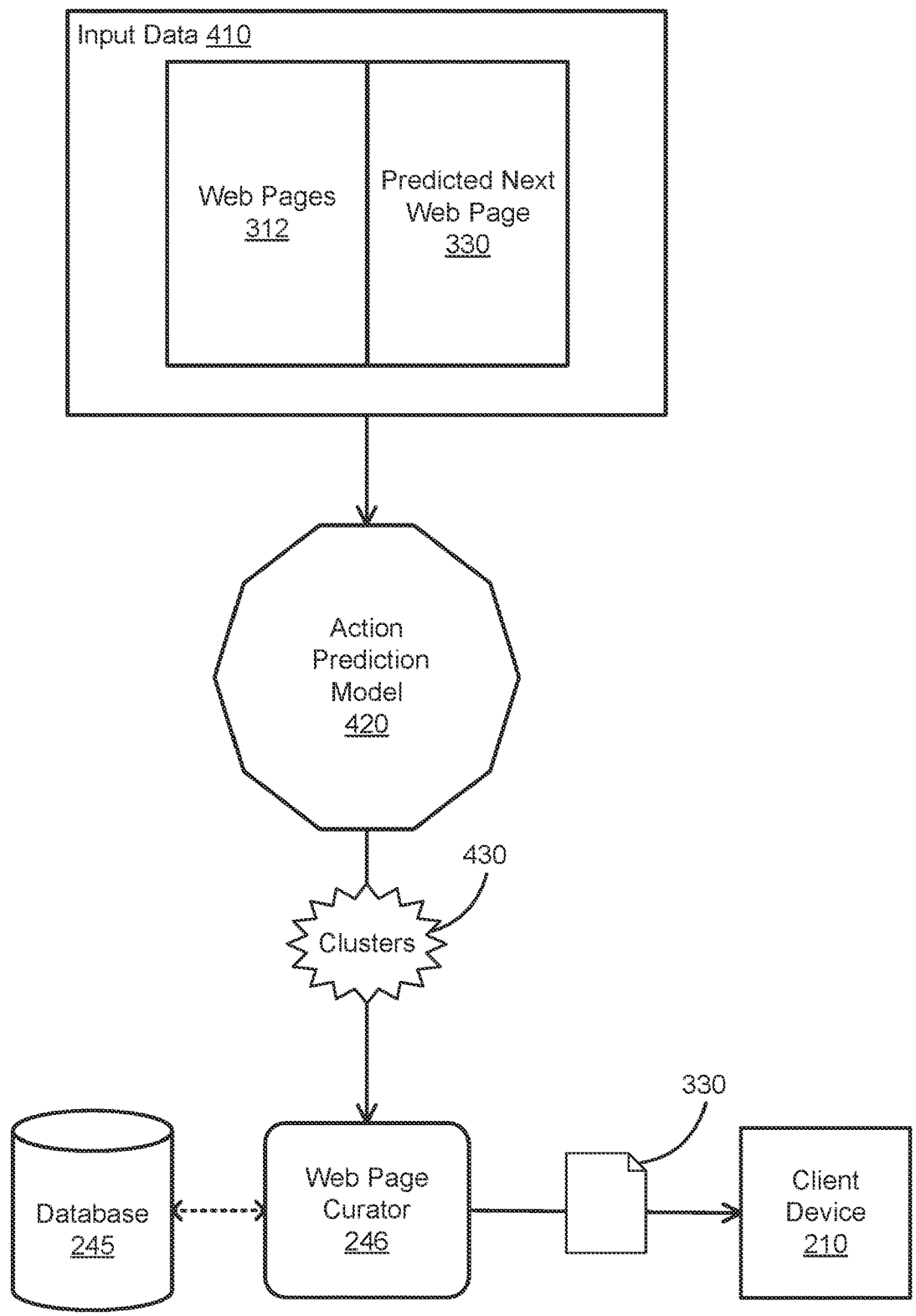
FIG. 4 a block diagram of a process using an action prediction model, in accordance with at least one embodiment.

FIG. 4 a block diagram of a process 400 using an action prediction model 420, in accordance with at least one embodiment. Components of the central database system 240 can perform the process 400. The action prediction model 420 may be a cluster model of the models 242. The process 400 includes components from FIG. 3 to demonstrate a relationship between identifying an action being performed by a user and predicting a web page that the user is likely to visit. In some embodiments, additional or fewer operations may be performed than shown in the process 400.

In the process 400, the action prediction model 420 receives input data 410 and outputs one or more clusters 430, where the input data 410 reflects a user's likely performance of an action represented by one of the clusters 430. The input data 410 may include web pages 312 viewed by a user and a predicted next web page 330 that was determined by the web page prediction model 320. Using the web pages viewed and likely to be viewed by the user, the action prediction model 420 may output one or more clusters 430 to identify which action the user is performing. The input data 410 may be in the form of feature vectors. The vector generator 243 may generate feature vectors using web pages (e.g., web page addresses) and additional information such as user characteristics (e.g., from the user profile 313) and/or the session context 311. Based on the cluster(s) 430 output by the action prediction model 420, the central database system 240 (e.g., the web page curator 246) may determine a cluster corresponding to an action performed by the user. For example, the web page curator 246 may determine that the identified action corresponds to the largest cluster. In some embodiments, a largest cluster determined by the web page curator 246 may refer to a cluster having exemplars extending across the largest volume of the vector space or the largest cluster may refer to a cluster having the largest scalar weight value. The cluster 430 may indicate an identifier (e.g., an identifier of an action) and an associated scalar weight or score that represents the cluster 430. The web page curator 246 may determine the user's action based on operator-provided labels applied to the clusters output during training of the cluster model by the model training engine 241.

Using the identified action determined from the one or more clusters 430, the web page curator 246 may determine a web page that the user is likely to visit in the course of performing the identified action. The web page curator 246 may query the database 245 for a web page that the user is likely to visit while performing the identified action, and the database 245 may return the web page 330. Although the web page 330 is shown as both being included within the input data 410 and provided to the client device 210, the web page curator 246 may provide a different web page that the user is likely to visit in the course of performing the identified action. For example, a data structure within the database 245 associating actions to web pages viewed may include multiple web pages, including the web page 330, for the action identified from the clusters 430.

In one example of the process 400, the action prediction model 420 may be used to identify search actions for an online manual or encyclopedia. The action prediction model 420 may be a cluster model trained using web pages of a domain containing the online manual, where different web pages of the domain correspond to different chapters of the online manual. Different search actions may correspond to searching for different topics in the chapters. The input data 410 may include web pages 312 previously viewed by a user on the online manual and a predicted next web page 330 they are likely to view, as determined by the web page prediction model 320. The action prediction model 420 is applied to the input data 410 to cluster the web pages 312 and 330 into one or more clusters 430.

The web page curator 246 may identify the largest cluster and determine a corresponding label for the cluster (e.g., based on operator-provided labels during training of the model 420). Where the online manual is for auto repair, the labels may be actions such as "querying brake repair," "querying tire maintenance," "querying cooling system repair," etc. The input data 410 may reflect the user's navigation to find information on how to change their tire, and the web page curator 246 may determine that the largest cluster from the clusters 430 corresponds to the action of "querying tire maintenance." The web page curator 246 may query the database 245 with the identified action of "querying tire maintenance" and receive one or more web page addresses of the online manual that are related to tire maintenance. The received web page addresses may include the predicted next web page 330, which may be provided to the client device 210 for display. The web page curator 246 may determine that the observed next web page a user views is unrelated to tire maintenance, and in response, generate an iframe on the observed next web page that includes a hyperlink to the predicted next web page 330 to help guide the lost user.

Example Web Navigation Using the Central Database System

Figure 5A:
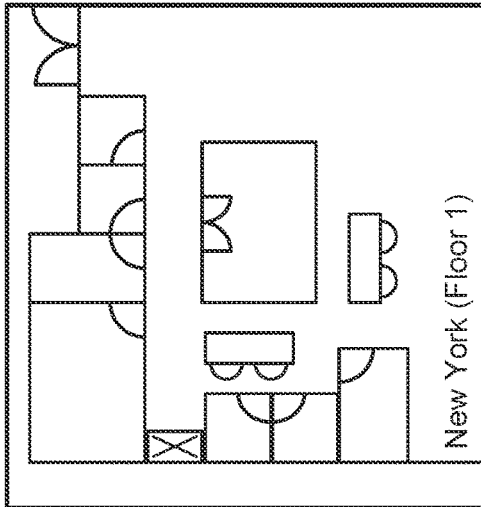
Figure 5A:
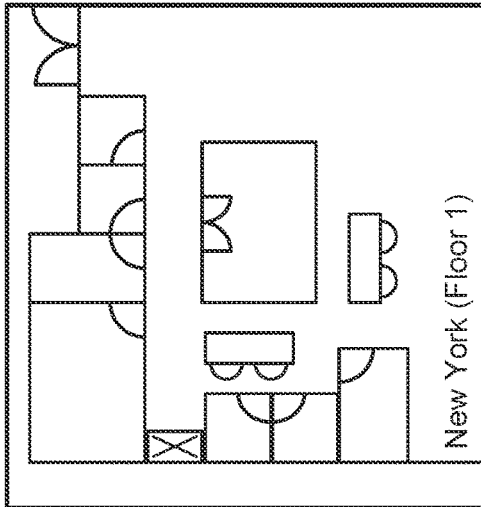
Figure 5A:

FIGS. 5A-5B show an example approach for predictive web navigation using the central database system described herein, in accordance with at least one embodiment. A series of web pages 501, 502, 503a, and 503b are shown in a chronological order in which a user visits the web pages. The web pages may be displayed on a web browser that is being executed on a client device, which is not depicted to promote clarity for viewing the example web pages. The example approach in FIGS. 5A-5B is a non-limiting example. The central database system described herein (e.g., the central database system 240) may track more or fewer web pages than the web pages 501, 502, and 503a before modifying an interface to display the webpage 503b.

In this example approach, a user has recently begun employment at Acme Co. and their profile in Acme Co.'s HR databases reflect the recent employment start date, agreements that have or have not been signed by the user, and other information relevant to the user's HR profile. On a date that is within the first week of their employment start date, the user opens Acme Co.'s intranet to find an agreement form to use the New York City office's gym.

Referring to FIG. 5A, the user lands on the web page 501 having an address 510 that reflects Acme Co.'s facilities department's homepage. The user may spend fifteen seconds on the web page 501, looking for gym forms. The user then navigates to the web page 502 having an address 511 that reflects Acme Co.'s floor maps in their various offices. Noticing that the web page 502 does not have any forms available for the user, the user navigates away from the web page 502 after spending only five seconds on the web page 502.

Referring to FIG. 5B, the user navigates away from the web page 502 and to the web page 503a, which has a web address 512 that reflects Acme Co.'s HR department's benefits portal. At this point, the user may feel frustrated or lost at not being able to find the gym form they are looking for. Without the central database system 240, the user may be left with the web page 503a displayed at their client device and close their web browser or stop searching further. This is undesirable, as the agreement form is located on Acme Co.'s domain and is unable to push itself towards the user. The neglected agreement form then occupies memory resources on Acme Co.'s servers that is wasted due to the lack of use. With the central database system 240, the user is presented with the web page 503*b*, which is a modified version of the web page 512 that includes a web element 520 (e.g., an iframe) having navigational instructions (e.g., hyperlinks) to web pages that the user may be looking for (e.g., a gym participation agreement form or gym equipment training video).

The central database system 240 is assisting the user in the example approach depicted in FIGS. 5A-5B. The central database system 240 can track the number and order of web pages viewed by the user. For example, the web page monitor 244 can track that the user has visited the web pages 501, 502, 503*a*, and 503*b*. Additionally, the web page monitor 244 may track how long the user has spent at particular web addresses. For example, the web page monitor 244 tracks that the user spent fifteen seconds at the web address 510 and five seconds at the web address 511. The central database system 240 may access user characteristics of the user. For example, the central database system 240 may access user characteristics that Acme Co.'s HR department has made available to the central database system 240 via storage at the database 220. The web page curator 246 may access user characteristics such as the user's start date, office location of New York City, and a record indicating that the user has not completed their gym participation agreement form. The central database system 240 may also access session context such as a time that the user accessed Acme Co.'s intranet. The web page curator 246 may provide the tracked web pages, user characteristics, and session context to the vector generator 243 to generate feature vectors for input into one of the models 242.

The central database system 240 may track the user's navigation across the web pages 501, 502, and 503*a* before determining that the user is likely lost. That is, the web page curator 246 may apply the generated feature vectors to a machine-learned model of the models 242 that is configured to classify a state of a user's navigation as lost or not lost. After determining that the user is lost, the web page curator 246 applies the generated feature vectors to a different machine-learned model of the models 242 to determine a predicted next webpage that the user is likely to view. In some embodiments, the determination by the web page curator 246 of a state of a user's navigation as being lost is optional; the web page curator 246 may skip this determination and apply the generated feature vectors to a machine-learned model to determine a predicted next web page (e.g., a web page containing the gym participation agreement form).

In some embodiments, the central database system 240 may determine which of the web page addresses 510, 511, and 512 to use for generating feature vectors. The vector generator 243 may determine keywords in the addresses to determine which addresses to use. For example, the vector generator 243 determines that address 510 includes keywords "dept," "facilities," and "default" that are shared across several domains (e.g., Acme Co.'s website, Boulder Inc.'s website, Corner Corp.'s website, etc.). The presence of keywords across various domains may indicate that the keywords are descriptive and the corresponding web addresses may be beneficial for inclusion in feature vectors. In the example approach shown in FIGS. 5A-5B, the web page addresses 510, 511, and 512 may all include keywords present across various domains and thus, the vector generator 243 may determine to generate a feature vector corresponding to each of the web page addresses, deciding not to filter out any of the web pages viewed by the user.

After determining a predicted next web page using a machine-learned model of the models 242, the central database system 240 may identify an action that the user is likely performing. The web page curator 246 may apply feature vectors representing the user's characteristics, session context, the web pages 501, 502, 503*a*, and a predicted next web page (e.g., a web page including the gym participation agreement form) to a cluster model of the models 242. The cluster model may cluster the feature vectors into one or more clusters, and the web page curator 246 may determine that a cluster corresponding to "querying gym information" is the identified action. The web page curator 246 may then determine that the web page 503*a* is unrelated to the identified action. For example, the web page curator 246 accesses a data structure mapping actions to related web pages and determines that the web page 503*a* is not related to "querying gym information." In response, the web page curator 246 modifies the web page 503*a*, producing the web page 503*b* that includes a web element 520 that can direct the user to the predicted next page including the gym participation agreement form (e.g., via the hyperlink 521).

In some embodiments, the central database system 240 may determine recommendations for an administrator of a web site to modify one or more web pages based on determinations by the web page curator 246, tracked web pages by the web page monitor 244, or a combination thereof. For example, the central database system 240 may determine multiple paths of web pages end-users of a website take to accomplish a particular action (e.g., find contact information of an organization advertising their services on the website) using the web page monitor 244 (e.g., to track the web pages) and web page curator 246 (e.g., to determine the particular action). The central database system 240 may then determine a recommended modification to one or more web pages on the website that is likely to reduce the number of web pages an end-user views to accomplish the particular action. For example, the central database 240 can track that more end-users, while searching for a map of a theme park while on the theme park's website, take paths of web pages based on uniform resource locators (URLs) that that are inserted into an image (i.e., the URL is accessible by clicking the image) that are shorter in length than end-users who take paths based on URLs inserted in text. The central database 240 may then recommend to the website administrator to use an image to accompany a URL rather than text (e.g., to shorten the number of pages an end-user navigates to access the theme park map). The central database system 240 may generate a GUI and a prompt with a recommendation on the GUI. Alternatively or additionally, the central database system 240 may be communicatively coupled to a third-party GUI (e.g., as an add-on) to generate the prompt with the recommendation.

Processes for Providing Predictive Web Navigation

Figure 6:
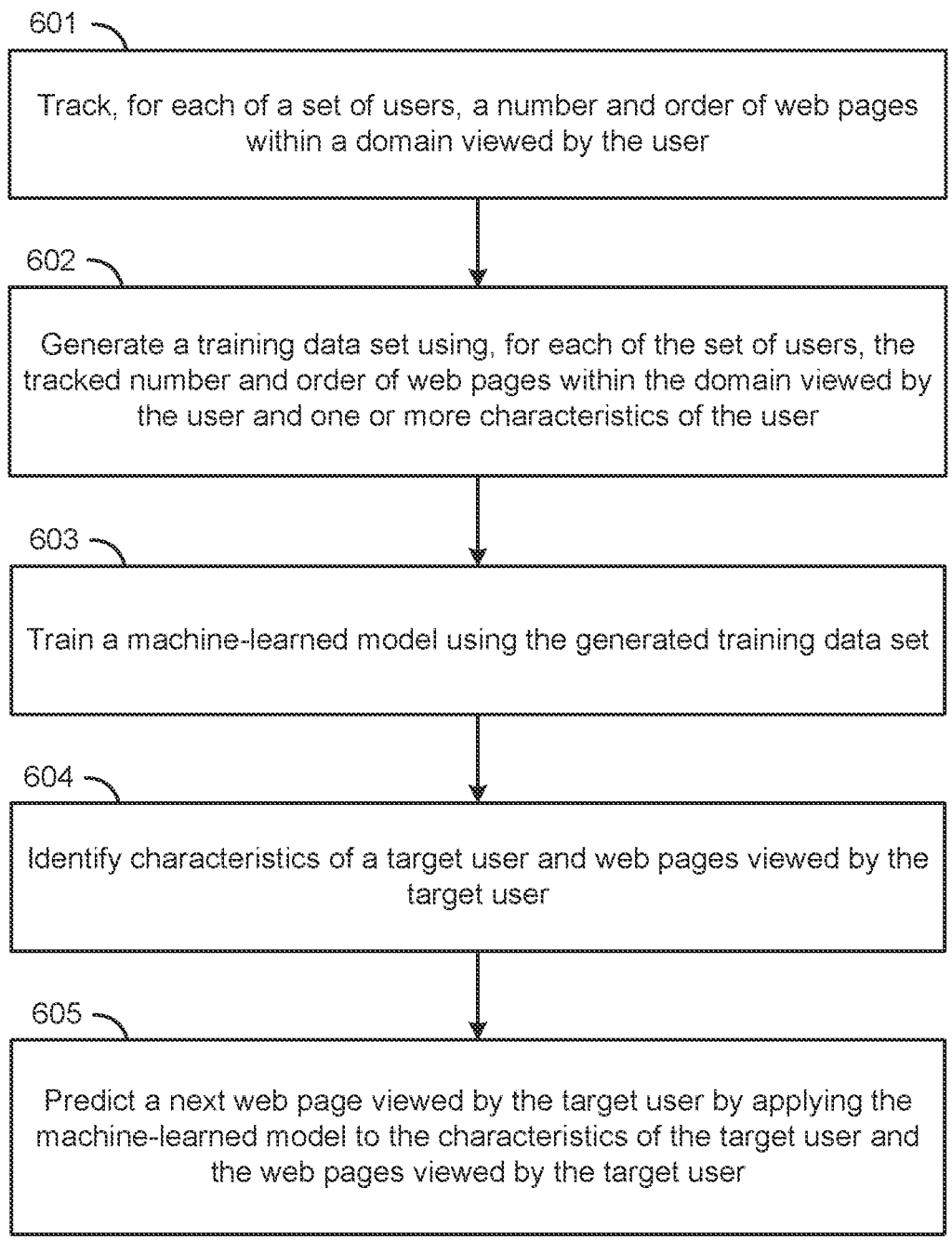
FIG. 6 is a flowchart illustrating a process for predicting a next web page to be viewed by a target user, in accordance with at least one embodiment.

FIG. 6 is a flowchart illustrating a process 600 for predicting a next web page to be viewed by a target user, in accordance with at least one embodiment. The process 600 may be performed by the central database system 240. However, some or all of the operations may be performed by other entities or components. In addition, some embodiments may perform the operations in parallel, perform the operations in different orders, or perform different operations. For example, an additional operation of generating feature vectors based on the identified 604 characteristics and web pages viewed may be added to the process 600 following the identification 604 of the characteristics and web pages viewed.

The central database system 240 tracks 601, for each of a set of users, a number and order of web pages within a domain viewed by the user. The web page monitor 244 may track pageview histories of multiple users within a domain (e.g., a website of an entity associated with the users), where the pageview histories include a number and order of web pages viewed. In a first example, the central database 240 tracks pageview histories of users navigating a financial institution's (e.g., banking or investment service) website to find tax documents. In a second example, the central database 240 tracks pageview histories of students navigating an online encyclopedia to find a particular equation. In a third example, the central database 240 tracks pageview histories of employees navigating their employer's intranet to find expense report forms.

The central database system 240 generates 602 a training data set using, for each of the set of users, the tracked number and order of web pages within the domain viewed by the user and one or more characteristics of the user. The model training engine 241 may generate the training data set. Following the previously described first example, the model training engine 241 may receive feature vectors representing the tracked pageview histories and user characteristics and label the received feature vectors with a next web page viewed in the pageview history. In particular, the model training engine 241 may use a label representing a web page at which a tax document is available, and apply the label to one or more feature vectors representing both respective web pages viewed before a user arrived on that web page and users characteristics such as types of investments the user has made. Following the previously described second example, the model training engine 241 may use a label representing a web page at which the particular equation is located, and apply the label to one or more feature vectors representing both respective web pages viewed before a student arrived on that web page and user characteristics such as a schedule of classes a student is taking or a college major in which the student is specializing. Following the previously described third example, the model training engine 241 may use a label representing a web page at which a expense report form is located, and apply the label to a combined vector representing both web pages viewed before a user arrived on that web page and user characteristics such as an employee's travel schedule and an employee's main office.

The central database system 240 trains 603 a machine-learned model using the generated training data set. The machine-learned model can be configured to predict a next web page to be viewed by a viewing user based on previous web pages viewed by the viewing user and characteristics of the viewing user. The model training engine 241 may train 603 the machine-learned model. Following the previously described first example, the model training engine 241 applies a machine-learned model to the training data set including feature vectors representing the previously viewed web pages of the financial institution's domain and user characteristics. Following the previously described second example, the model training engine 241 applies a machine-learned model to the training data set including feature vectors representing previously viewed web pages of the online encyclopedia and user characteristics. Following the previously described third example, the model training engine 241 applies a machine-learned model to the training data set including feature vectors representing previously viewed web pages of an employer's intranet and user characteristics. The model training engine 241 may train different machine-learned models for each of these examples, and each of the models may be included in the models 242.

The central database system 240 identifies 604 characteristics of a target user and web pages viewed by the target user. The web page curator 246 may identify 604 the characteristics and web pages that are monitored by the web page monitor 244. Following the previously described first example, the web page curator 246 identifies user characteristics that a user is self-employed (e.g., from employment status stored at the user's profile on their financial institution account, which can be accessible to the central database system 240) and an order and number of web pages the user has viewed while looking for tax documents. Following the previously described second example, the web page curator 246 identifies user characteristics that a student is taking a physics class and is majoring in electrical engineering. Additionally, the web page curator 246 identifies an order and a number of web pages that the student has viewed on the online encyclopedia while looking for a particular equation (e.g., for Maxwell's Equations). Following the previously described third example, the web page curator 246 identifies user characteristics that an employee has recently traveled to an employer's New York office from their San Francisco main office. Additionally, the web page curator 246 may identify web pages viewed by the employee while looking for an expense report form.

The central database system 240 predicts 605 a next web page viewed by the target user by applying the machine-learned model to the characteristics of the target user and the web pages viewed by the target user. The web page curator 246 can predict 605 the next web page using a machine-learned model of the models 242. Following the previously described first example, the web page curator 246 uses the trained machine-learned model to predict that the user is looking for a 1099-DIV form from the financial institution. Following the previously described second example, the web page curator 246 uses the trained machine-learned model to predict that the student is looking for Maxwell's Equations. Following the previously described third example, the web page curator 246 uses the trained machine-learned model to predict that the employer is looking for an expense report form for reimbursing a taxi taken from the airport to the office.

FIG. 7 is a flowchart illustrating a process 700 for modifying an interface to direct a user to a predicted next web page, in accordance with at least one embodiment. The process 700 may be performed by the central database system 240. However, some or all of the operations may be performed by other entities or components. In addition, some embodiments may perform the operations in parallel, perform the operations in different orders, or perform different operations. For example, the application 704 of the machine-learned model may happen in parallel with or before the training 703 of the cluster model.

The central database system 240 identifies 701, for each of a set of historical users, an action being performed by the historical user within a domain and a set of web pages viewed by the historical user while performing the action. In some embodiments, the model training engine 241 may use human operator feedback to identify actions being performed as historical users are navigating the domain. For example, a human operator may label a set of web pages viewed by a student navigating an online encyclopedia as an action of querying Maxwell's Equations. In some embodiments, the model training engine 241 may automatically identify actions being performed as historical users are navigating the domain. For example, the model training engine 241 may access the content of the web pages of the online encyclopedia (e.g., via web markup provided by the website host or encyclopedia publisher), identify headings or frequently appearing, descriptive terms in the web page content, and use the identified headings or terms to represent actions performed by the user. A heading of "Maxwell's Equations" may e used by the model training engine 241 to identify that the action being performed by the user viewing the web page with that heading is querying Maxwell's Equations.

The central database system 240 generates 702 a training data set including, for each of the set of historical users, the identified action and the set of web pages viewed while the action is being performed. The model training engine 241 can generate 702 the training data set. The model training engine 241 may use the vector generator 243 to create feature vectors from the set of web pages viewed while the action is being performed. For example, the model training engine 241 generates a training data set with combined vectors that represents various students' series of online encyclopedia web pages visited while trying to find various topics (e.g., Maxwell's Equations, Faraday's Law, Hall Effect, etc.). The model training engine 241 may identify a number of the identified actions corresponding to the students trying to find topics within the online encyclopedia.

The central database system 240 trains 703 a cluster model using the training data set. The model training engine 241 may train 703 the cluster model. The cluster model can be configured to predict a desired action to be performed by an acting user based on web pages viewed by the acting user. In an example where the model training engine 241 applies a k-means clustering algorithm for the cluster model, the model training engine 241 may use the feature vectors of the training data set and a number of actions identified in the training set to group the feature vectors into a number of clusters matching the number of identified actions. Student pageview histories while browsing an online encyclopedia may be represented by feature vectors and clustered into clusters corresponding to topics for which the students were looking.

The central database system 240 applies 704 a machine-learned model to web pages viewed by a target user to predict a next web page to be viewed by the target user. The web page curator 246 may apply a machine-learned model of the models 242 to one or more feature vectors representing web pages viewed by the target user. The feature vectors may represent additional information related to the target user's web navigation such as session context or user characteristics. For example, the web page curator 246 may apply a machine-learned model to feature vectors representing a sequence of web page addresses of a student browsing the online encyclopedia from a web page describing electric charge to a web page describing magnetic fields. In some embodiments, the feature vectors, as generated by the vector generator 243, may also represent web pages viewed by other users within a threshold period of time from the current time (e.g., within the last week). The web page curator 246 may determine, using a machine-learned model trained using feature vectors representing historical student page views that reflect a journey from a web page on electric charge, to magnetic fields, and finally to Maxwell's Equations, that the predicted next web page for the present student is likely to be the web page describing Maxwell's Equations.

The central database system 240 applies 705 the cluster model to the web pages viewed by the target user and the predicted next web page to identify an action being performed by the target user. The web page curator 246 may apply 705 the cluster model to feature vectors, generated by the vector generator 243 from the viewed and predicted web pages, to identify one or more clusters corresponding to likely actions that may be reflected in the viewed and predicted web pages. For example, the web page curator 246 applies a cluster model to web pages of an online encyclopedia viewed by a student and a predicted web page that the student will likely view. The cluster model may output a cluster corresponding to an action of querying Maxwell's Equations based on an input of feature vectors representing previously viewed web pages describing electric charge and magnetic fields and a predicted web page describing Maxwell's Equations.

The central database system 240 determines 706 whether an observed next web page viewed by the target user is unrelated to the identified action being performed by the target user. In response to determining that the observed next web page is unrelated to the identified action, the central database system 240 proceeds to modify 707 an interface. In response to determining that the observed next web page is related to the identified action, the central database system 240 returns to apply 704 the machine-learned model to additional web pages viewed by the target user (e.g., to continue assisting the user during a different action being performed in the event that the user loses their navigation while performing the different action). In some embodiments, the web page curator 246 may access a data structure in the database 245 that maps actions to web pages, and determine, using the data structure, whether the identified action is unrelated to an observed next web page. For example, the web page monitor 244 tracks that a student has visited an observed next web page describing Carl Friedrich Gauss, and the web page curator 246 determines, using the data structure with mappings, that the observed next web page is unrelated to the predicted next web page describing Maxwell's Equations.

The central database system 240 modifies 707 an interface displayed to the target user to include a web element to direct the target user to the predicted next web page. The web page curator 246 may modify 707 the interface to direct the target user to the predicted next web page. For example, after determining that a student is likely looking for Maxwell's Equations on an online encyclopedia but has landed on a biographic web page of the physicist Gauss, the web page curator 246 may modify the interface of the biographic web page to include a web element of an iframe having a hyperlink to a web page describing Maxwell's Equations. An example modification to an interface is depicted in FIG. 5B.

ADDITIONAL CONSIDERATIONS

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
   identifying, by a central database system for each of a plurality of historical users, an action being performed by the historical user within a domain and a set of consecutive web pages viewed by the historical user while performing the action, each of the consecutive web pages corresponding to a web address and each web address corresponding to a web page of the consecutive web pages within a threshold similarity of the web address corresponding to each other web page of the consecutive web pages;
   generating, by the central database system, a training data set comprising, for each of the plurality of historical users, the identified action and the set of web pages viewed while the action is being performed;
   training, by the central database system, a cluster model using the training data set, the cluster model configured to predict a desired action to be performed by an acting user based on web pages viewed by the acting user;
   applying, by the central database system, the cluster model to web pages viewed by a target user and a predicted next web page to be viewed by the target user to identify an action being performed by the target user; and
   retraining the cluster model in response to determining that the target user is performing a new action different from actions performed by the plurality of historical users.

2. The method of claim 1, wherein training the cluster model using the training data set comprises:
   determining a number of identified actions performed by the plurality of historical users;
   generating vectors representing respective web page addresses of the sets of web pages of the training data set; and
   applying the cluster model to the generated vectors and the number of identified actions, the cluster model clustering the generated vectors into a number of clusters corresponding to the number of identified actions.

3. The method of claim 1, wherein applying the cluster model to the web pages viewed by the target user and the predicted next web page to be viewed by the target user comprises:
   generating vectors representing respective web page addresses of the web pages viewed by the target user and the predicted next web page; and
   applying the cluster model to the generated vectors and a number of identified actions performed by the plurality of historical users, the cluster model clustering the generated vectors into a number of clusters corresponding to the number of identified actions.

4. The method of claim 1, wherein identifying that the target user is performing the new action comprises identifying a new cluster output by the cluster model in response to applying the cluster model to the web pages viewed by the target user and the predicted next web page.

5. The method of claim 4, wherein identifying the new cluster comprises determining a center of the new cluster is at least a threshold distance from each center of clusters output by the cluster model corresponding to the number of identified actions.

6. The method of claim 1, wherein the training data set is a first training data set, and further comprising:
   incrementing a number of the actions performed by the plurality of historical users based on the new action;
   generating a second training data set comprising the first training data set, the web pages viewed by the target user, and the new action; and
   retraining the cluster model using the second training data set.

7. The method of claim 1, further comprising modifying, by the central database system, an interface displayed to the target user to include a web element to direct the target user to the predicted next web page in response to determining that an observed next web page viewed by the target user is unrelated to the identified action.

8. The method of claim 7, wherein the web element is an iframe, and wherein modifying the interface displayed to the target user to include the iframe to direct the target user to the predicted next web page comprises:
   causing the iframe having a hyperlink to the predicted next web page to be displayed at the interface.

9. The method of claim 1, further comprising:
tracking that the target user navigated to the predicted next web page and a duration of time that the target user spent viewing the predicted next web page; and
in response to determining that the duration of time exceeds a threshold duration, retraining the cluster model to strengthen a second association between the web pages viewed by the target user and the identified action.

10. The method of claim 9, further comprising:
in response to determining that the duration of time does not exceed the threshold duration, retraining the cluster model to weaken the second association between the web pages viewed by the target user and the identified action.

11. The method of claim 1, further comprising:
generating vectors representing web page addresses of the web pages viewed by the target user; and
determining a combined vector using the generated vectors;
wherein the predicted next web page to be viewed by the target user is determined based on the combined vector.

12. The method of claim 11, wherein determining the combined vector using the generated vectors comprises:
calculating a plurality of similarity metrics between a web address of the latest viewed web page of the web pages viewed with web addresses of a set of the web pages viewed before the latest viewed web page; and
identifying a subset of the generated vectors corresponding to a subset of the web page addresses having at least a threshold similarity metric with the web page address of the latest viewed web page, wherein the subset of the generated vectors is used to determine the combined vector.

13. A non-transitory computer readable medium comprising stored instructions that, when executed by one or more processors, cause the one or more processors to:
identify, for each of a plurality of historical users, an action being performed by the historical user within a domain and a consecutive set of web pages viewed by the historical user while performing the action, each of the consecutive web pages corresponding to a web address and each web address corresponding to a web page of the consecutive web pages within a threshold similarity of the web address corresponding to each other web page of the consecutive web pages;
generate a training data set comprising, for each of the plurality of historical users, the identified action and the set of web pages viewed while the action is being performed;
train a cluster model using the training data set, the cluster model configured to predict a desired action to be performed by an acting user based on web pages viewed by the acting user;
apply the cluster model to web pages viewed by a target user and a predicted next web page to be viewed by the target user to identify an action being performed by the target user; and
retrain the cluster model in response to determining that the target user is performing a new action different from actions performed by the plurality of historical users.

14. The non-transitory computer readable medium of claim 13, wherein the instruction to train the cluster model using the training data set comprises instructions that, when executed by the one or more processors, further cause the one or more processors to:
determine a number of identified actions performed by the plurality of historical users;
generate vectors representing respective web page addresses of the sets of web pages of the training data set; and
apply the cluster model to the generated vectors and the number of identified actions, the cluster model clustering the generated vectors into a number of clusters corresponding to the number of identified actions.

15. The non-transitory computer readable medium of claim 13, wherein the instruction to apply the cluster model to the web pages viewed by the target user and the predicted next web page to be viewed by the target user comprises instructions that, when executed by the one or more processors, further cause the one or more processors to:
generate vectors representing respective web page addresses of the web pages viewed by the target user and the predicted next web page; and
apply the cluster model to the generated vectors and a number of identified actions performed by the plurality of historical users, the cluster model clustering the generated vectors into a number of clusters corresponding to the number of identified actions.

16. The non-transitory computer readable medium of claim 13, wherein the instructions, when executed by the one or more processors, further cause the one or more processors to:
track that the target user navigated to the predicted next web page and a duration of time that the target user spent viewing the predicted next web page; and
in response to determining that the duration of time exceeds a threshold duration, retrain the cluster model to strengthen a second association between the web pages viewed by the target user and the identified action.

17. A system comprising:
one or more processors; and
a non-transitory computer readable storage medium storing executable instructions that, when executed by one or more processors, cause the one or more processors to:
identify, for each of a plurality of historical users, an action being performed by the historical user within a domain and a set of consecutive web pages viewed by the historical user while performing the action, each of the consecutive web pages corresponding to a web address and each web address corresponding to a web page of the consecutive web pages within a threshold similarity of the web address corresponding to each other web page of the consecutive web pages;
generate a training data set comprising, for each of the plurality of historical users, the identified action and the set of web pages viewed while the action is being performed;
train a cluster model using the training data set, the cluster model configured to predict a desired action to be performed by an acting user based on web pages viewed by the acting user;
apply the cluster model to web pages viewed by a target user and a predicted next web page to be viewed by the target user to identify an action being performed by the target user; and
retrain the cluster model in response to determining that the target user is performing a new action different from actions performed by the plurality of historical users.

18. The system of claim 17, wherein the instruction to train the cluster model using the training data set comprises instructions that, when executed by the one or more processors, further cause the one or more processors to:
- determine a number of identified actions performed by the plurality of historical users;
- generate vectors representing respective web page addresses of the sets of web pages of the training data set; and
- apply the cluster model to the generated vectors and the number of identified actions, the cluster model clustering the generated vectors into a number of clusters corresponding to the number of identified actions.

19. The system of claim 17, wherein the instruction to apply the cluster model to the web pages viewed by the target user and the predicted next web page to be viewed by the target user comprises instructions that, when executed by the one or more processors, further cause the one or more processors to:
- generate vectors representing respective web page addresses of the web pages viewed by the target user and the predicted next web page; and
- apply the cluster model to the generated vectors and a number of identified actions performed by the plurality of historical users, the cluster model clustering the generated vectors into a number of clusters corresponding to the number of identified actions.

20. The system of claim 17, wherein the instructions, when executed by the one or more processors, further cause the one or more processors to:
- track that the target user navigated to the predicted next web page and a duration of time that the target user spent viewing the predicted next web page; and
- in response to determining that the duration of time exceeds a threshold duration, retrain the cluster model to strengthen a second association between the web pages viewed by the target user and the identified action.

* * * * *